Figure 1:
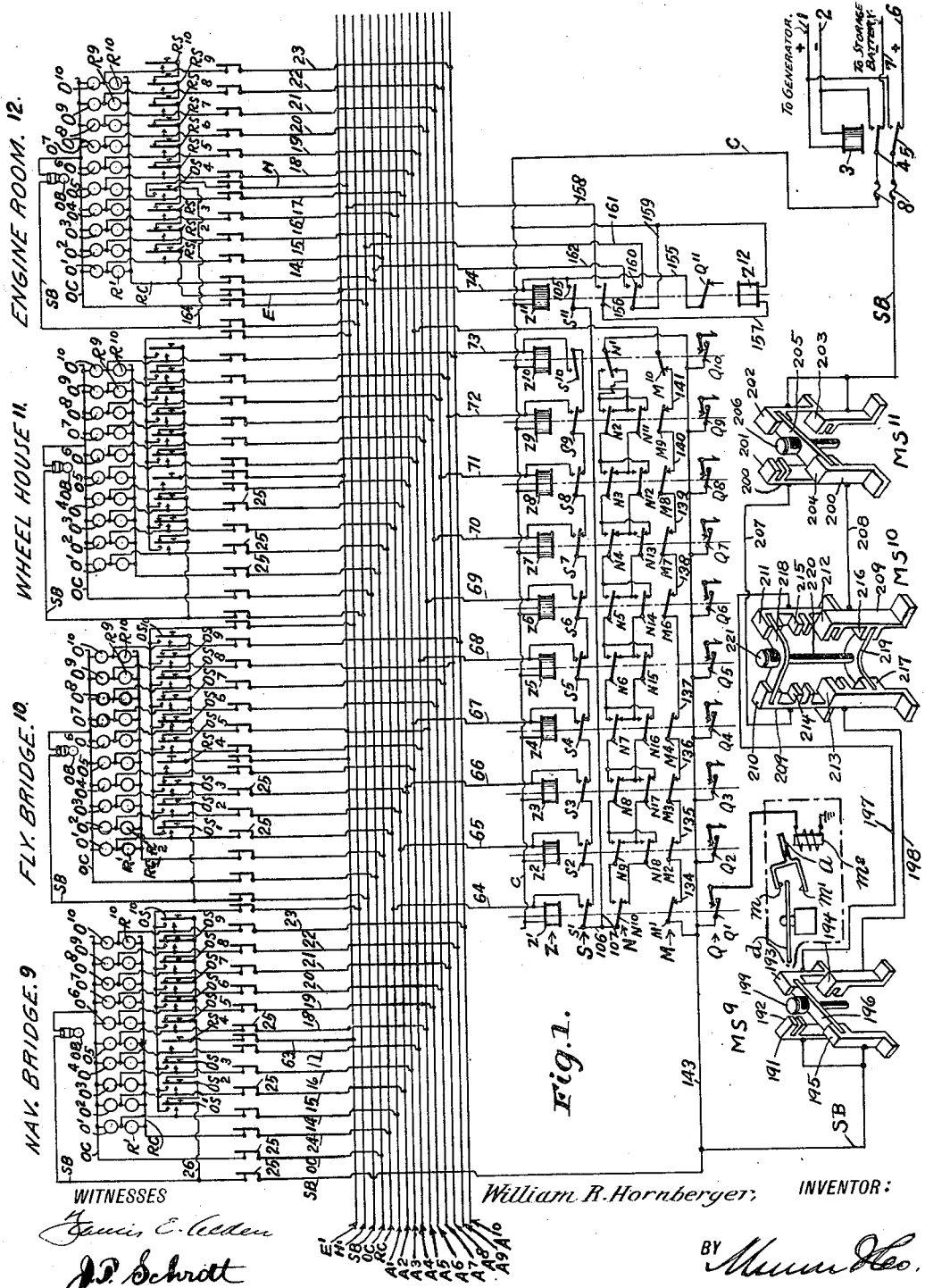

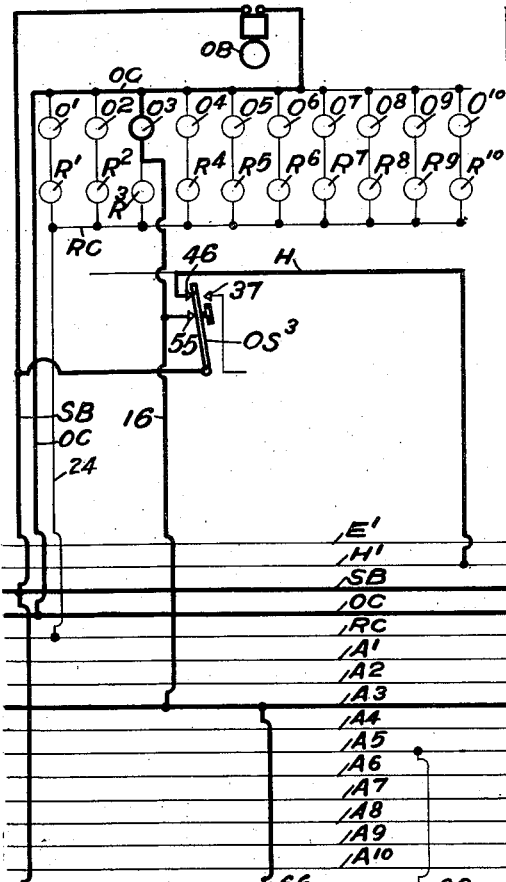
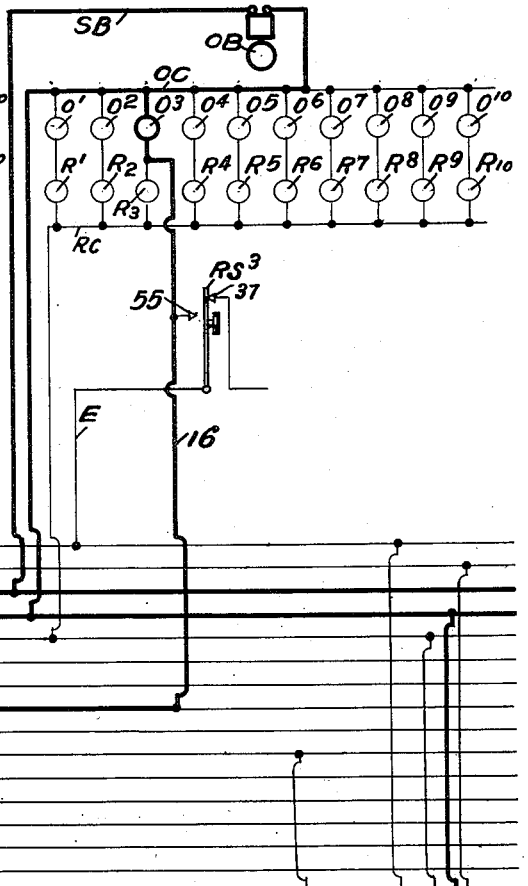
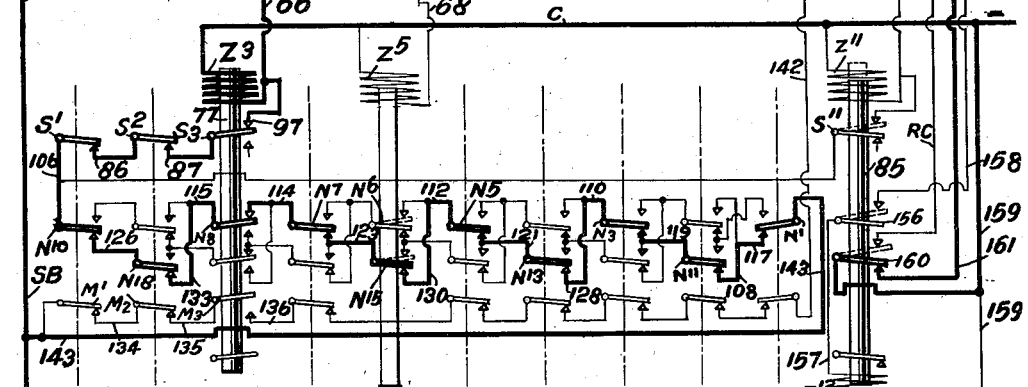
Fig. 4.

March 2, 1926.
W. R. HORNBERGER
SHIP TELEGRAPH
Filed Nov. 28, 1919   10 Sheets-Sheet 5
1,575,599
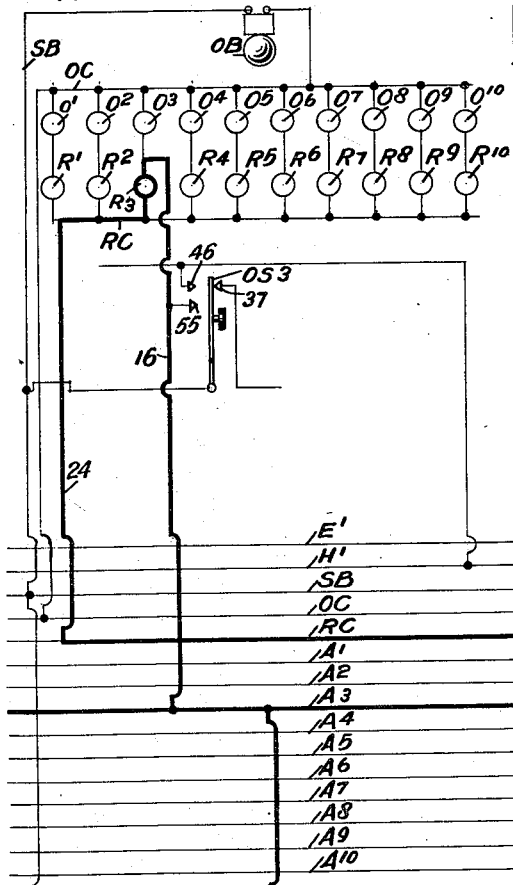
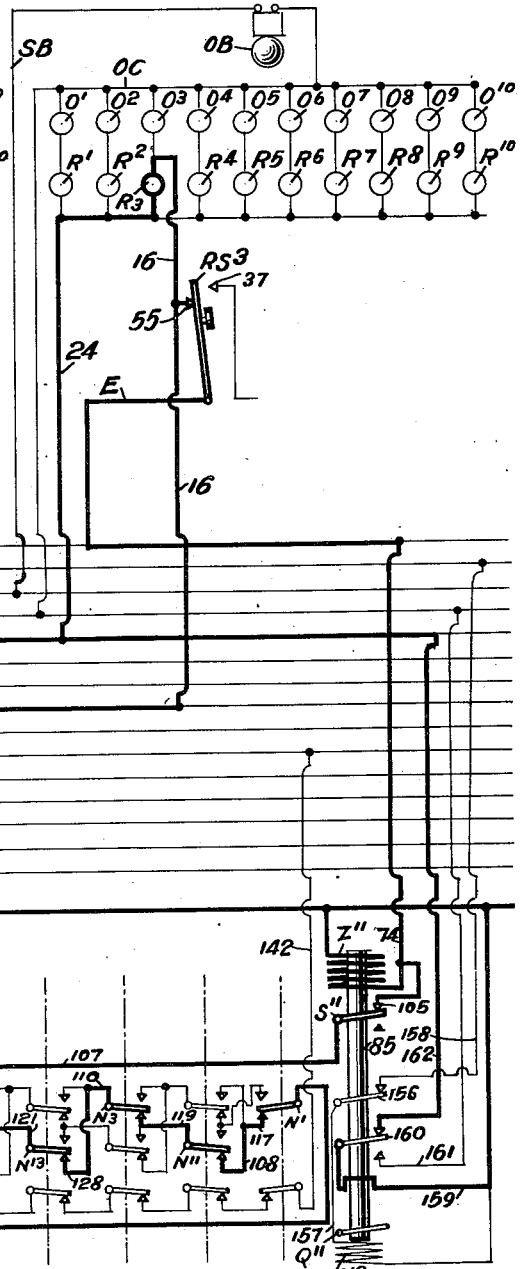
Fig. 5.

March 2, 1926.
W. R. HORNBERGER
SHIP TELEGRAPH
Filed Nov. 28, 1919 10 Sheets-Sheet 8
1,575,599
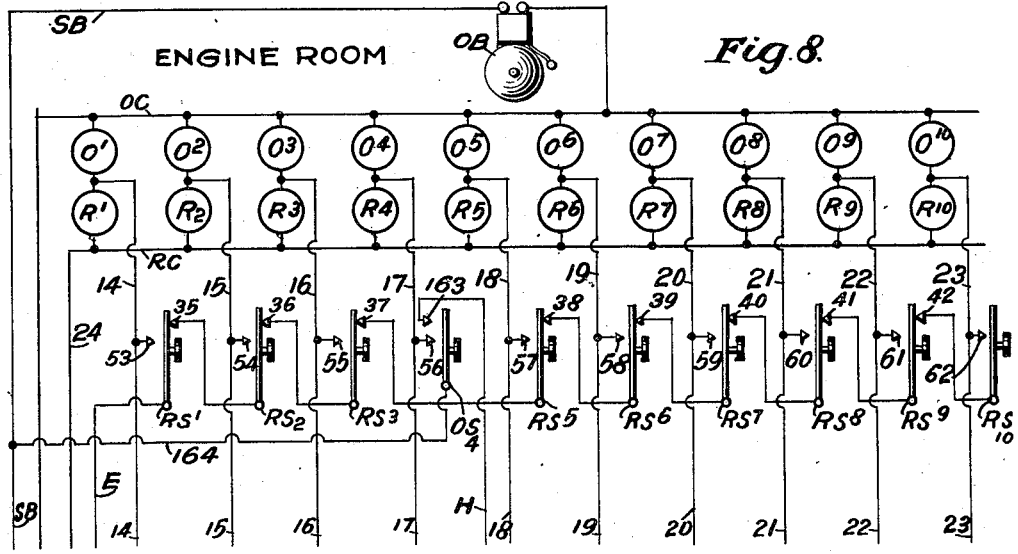
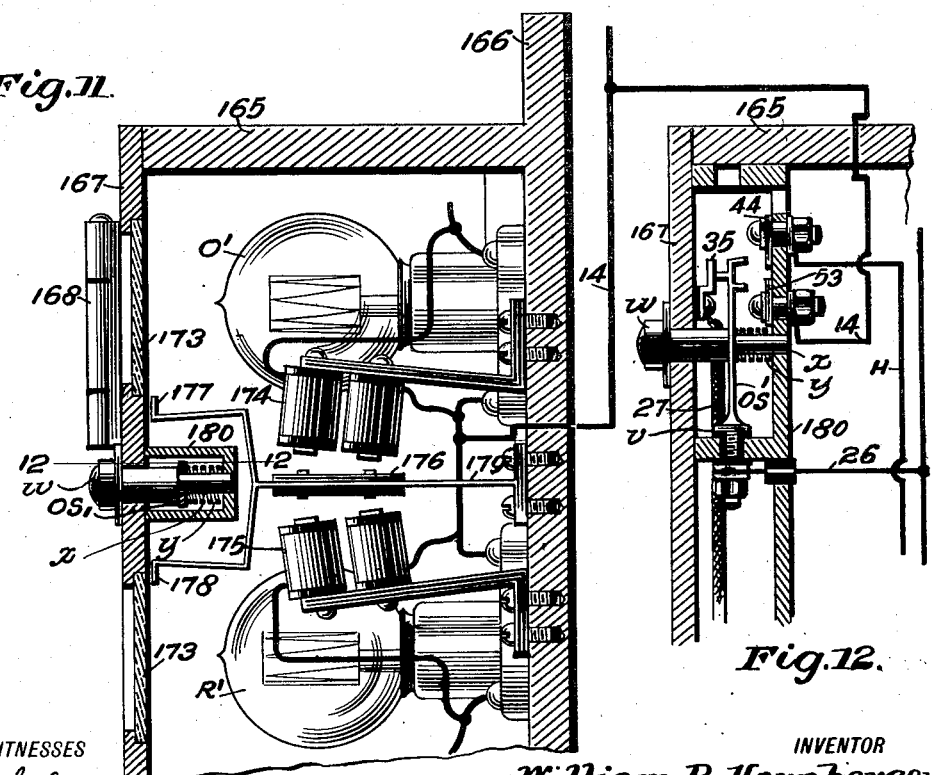

March 2, 1926. 1,575,599
W. R. HORNBERGER
SHIP TELEGRAPH
Filed Nov. 28, 1919 10 Sheets-Sheet 9

WITNESSES
J. P. Schrott

INVENTOR
William R. Hornberger
BY
ATTORNEYS

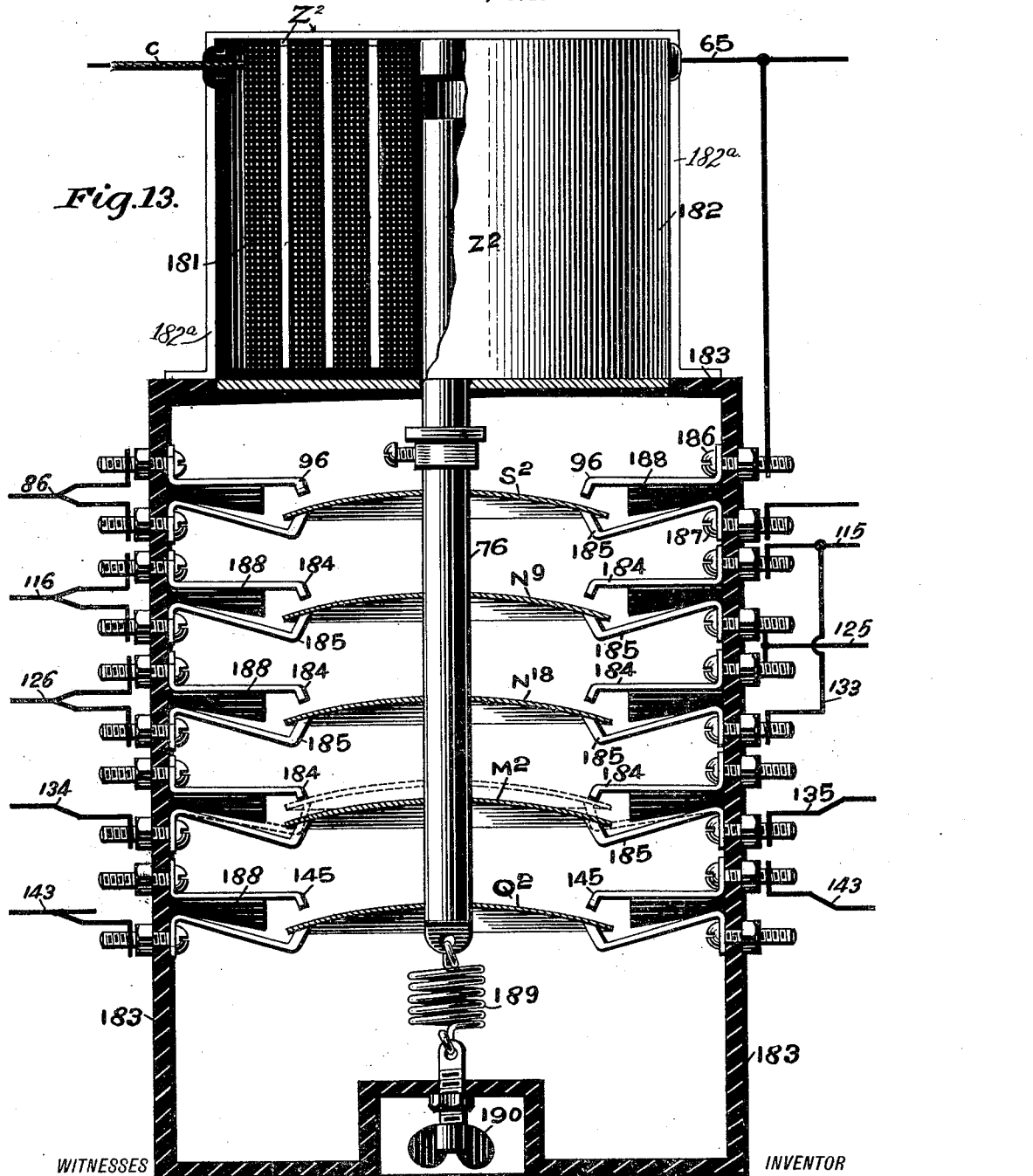

Patented Mar. 2, 1926.

1,575,599

UNITED STATES PATENT OFFICE.

WILLIAM REED HORNBERGER, OF PHILADELPHIA, PENNSYLVANIA, ASSIGNOR OF ONE-HALF TO CHARLES A. GEHRMANN, OF PHILADELPHIA, PENNSYLVANIA.

SHIP TELEGRAPH.

Application filed November 28, 1919. Serial No. 341,004.

*To all whom it may concern:*

Be it known that I, WILLIAM R. HORNBERGER, a citizen of the United States, and a resident of Philadelphia, in the county of Philadelphia and State of Pennsylvania, have invented certain new and useful Improvements in Ship Telegraphs, of which the following is a specification.

My invention relates to improvements in ship telegraphs, and it consists in the constructions, combinations and arrangements herein described and claimed.

Among a number of principal objects of the invention, the foremost is to provide a ship telegraph wherein all of the order bells keep ringing and all of the order indications of a particular kind remain visible throughout the entire system, until that particular order is replied to by the receiver in the engine room, whereupon all bells and order indications are automatically silenced and extinguished, the reply indications alone remaining visible throughout the system until a new order is transmitted.

A further object of the invention is to provide a ship telegraph wherein, upon closure of the main switch at any of the "order" or transmitting stations, the "stand by" order is automatically rendered prominent and the companion order bell is rung at each station throughout the system, thereby attracting the attention of all operators and the receiver and admonishing the receiver to hold himself in readiness for an ensuing order.

A further object of the invention is to provide means for notifying all operators and the receiver of the sudden return of the current after a temporary current failure whereupon the entire system was rendered "dead", said means comprising the same structure described in the foregoing objects.

A further object of the invention is to provide a flexible ship telegraph wherein any number of transmitting or receiving instruments may be used, these being connected in multiple, permitting the use of any number of lamps, bells, or other indications, and by the use of suitable switches, enabling repairs to be made without disabling the system.

A further object of the invention is to provide a ship telegraph wherein a special arrangement is made for breaking the circuits at points other than at the transmitting instruments, thereby enabling the use of air and water-tight casings for said transmitting instruments by the fact of elimination of gases at the contact breaking point.

A further object of the invention is to provide means giving the operator immediate notice of a mechanical or electrical failure of any one of the order controlling relays, said means comprising an automatic self-controlled "stick" circuit embracing all of the relays.

A further object of the invention is to arrange the order switches in the transmitting instruments and the order controlling relays in such a way that it becomes impossible to energize more than one relay, and consequently hold it in the operative position at one time.

A further object of the invention is to provide a ship telegraph by means of which orders are transmitted to one or more receiving instruments in the engine room from one or more "order" stations distributed about the ship, certain peculiar and novel arrangements making it impossible for the engineer to reply to any but a given order.

A further object of the invention resides in the novel arrangement of the telegraph whereby the various "order" stations about the ship are positively notified of engine trouble, the order to that effect coming from the engineer and being arranged to take precedence over any order then up in view.

A further object of the invention is to provide means in a ship telegraph, whereby a signal when rendered operative is automatically and electrically locked in such position.

A further object of the invention resides in the combination of a suitable time recording mechanism with the order controlling relays, so that a record of the time of transmission and reply to an order may be kept.

Other objects and advantages of the invention will appear in the following specification, reference being had to the accompanying drawings, in which:—

Figure 2:
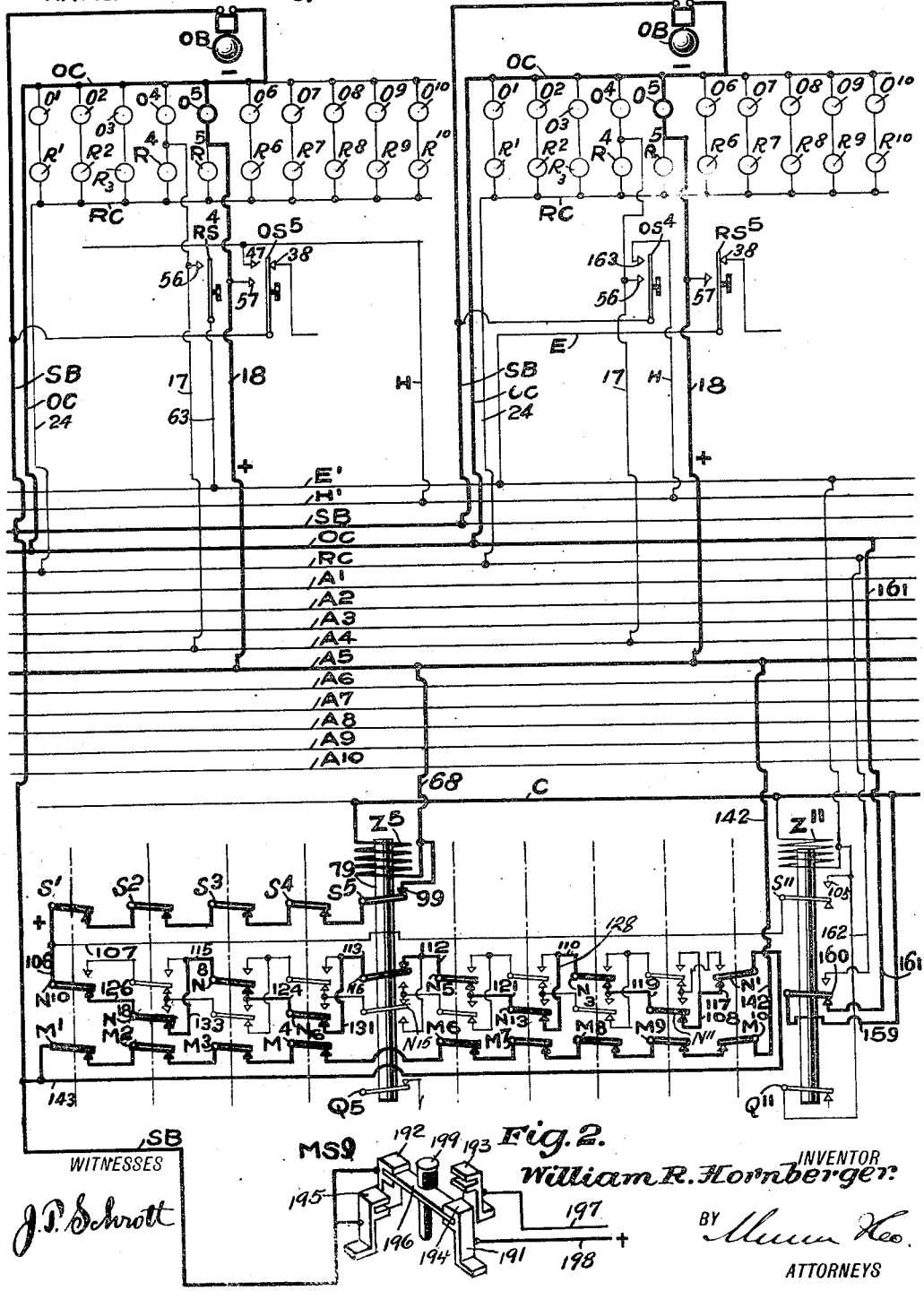
Figure 3:
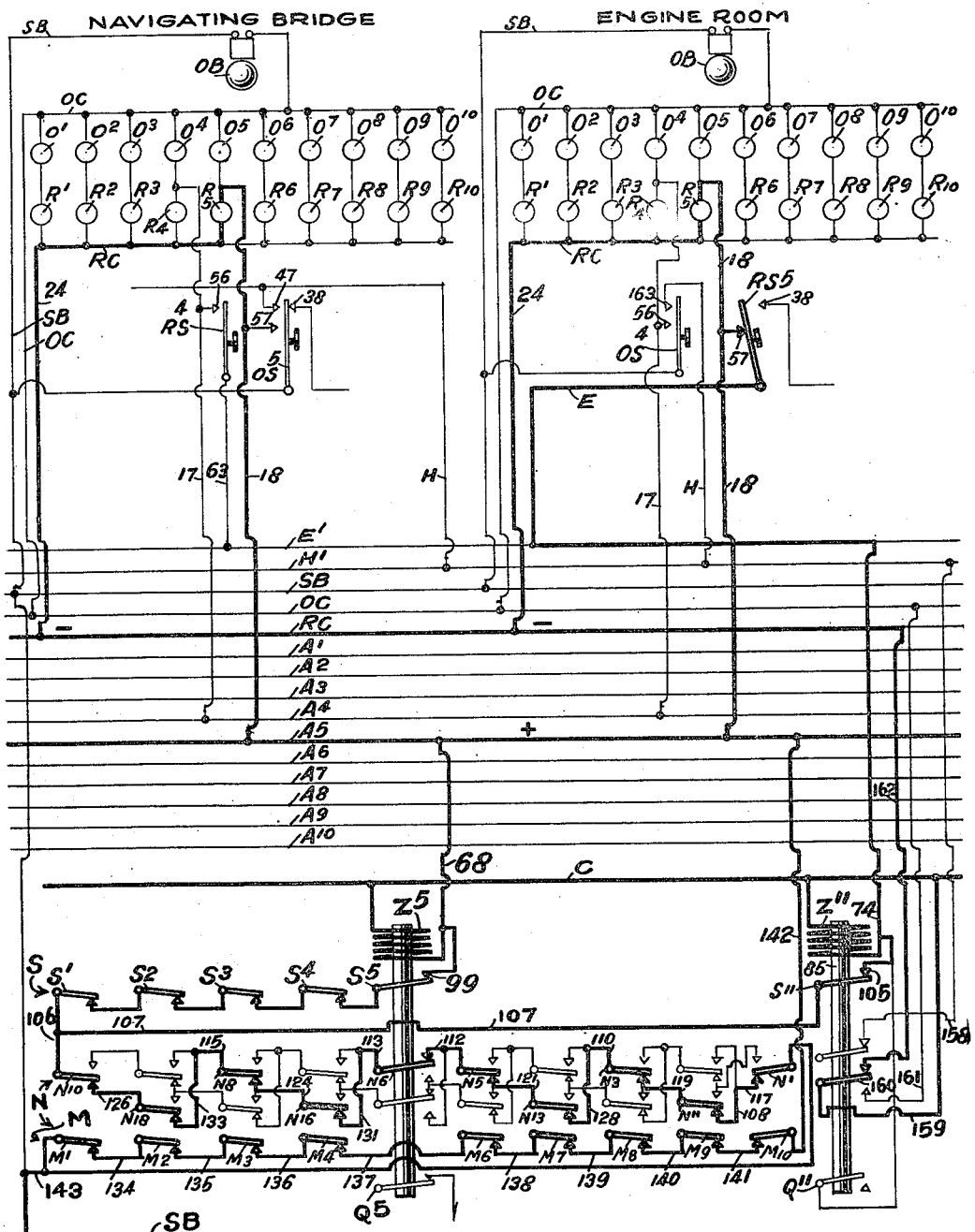
Figure 6:
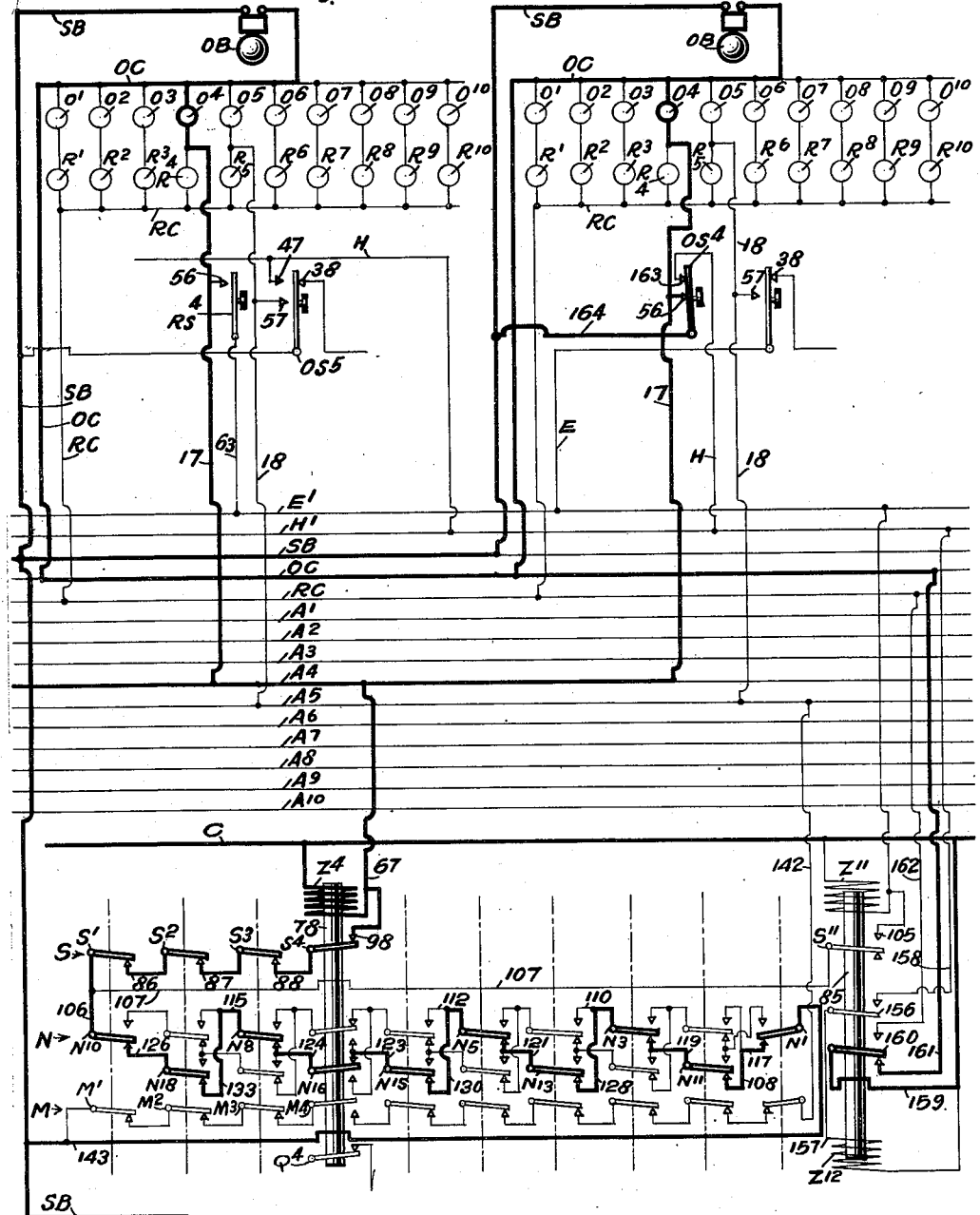
Figure 7:
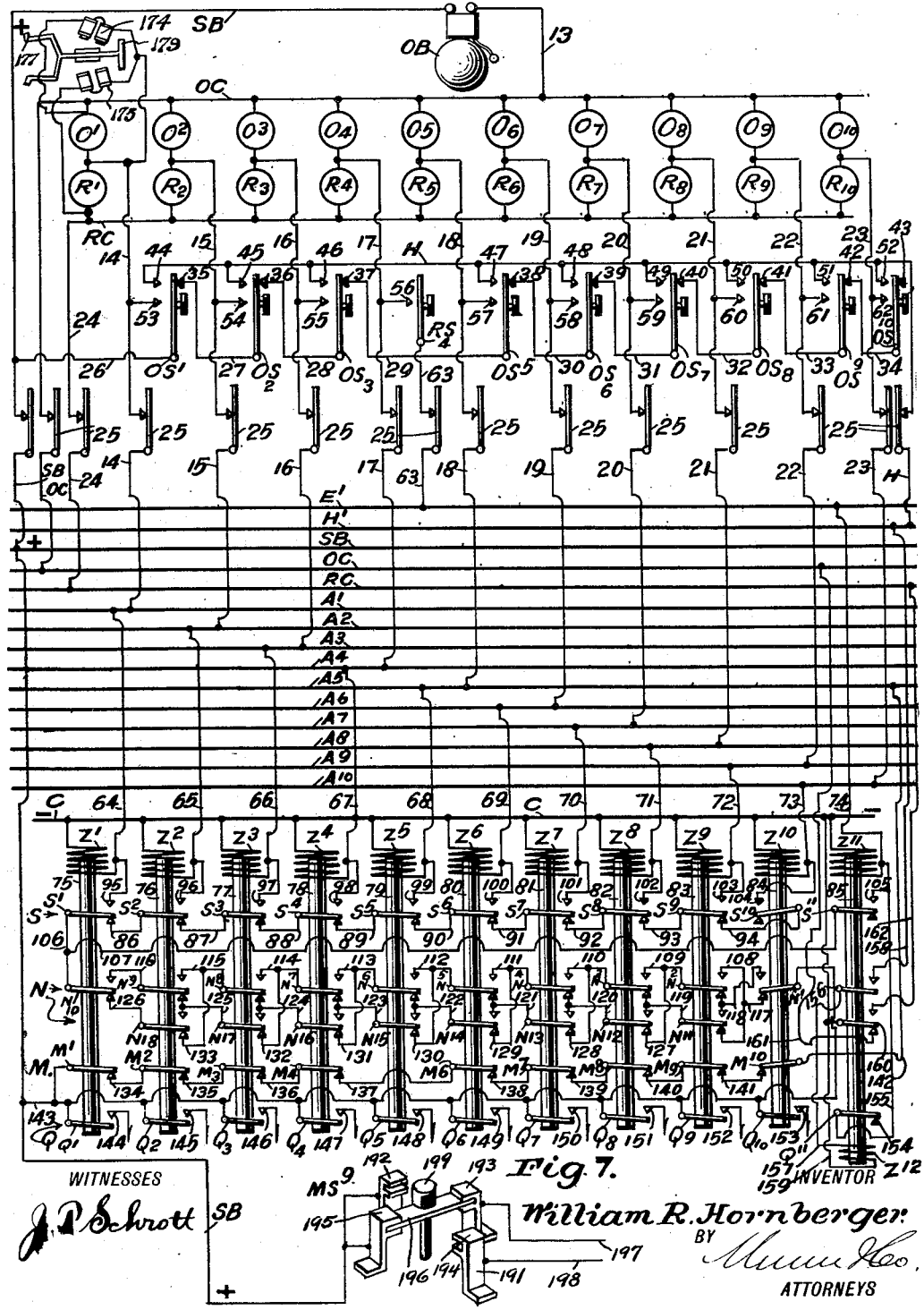
Figure 9:
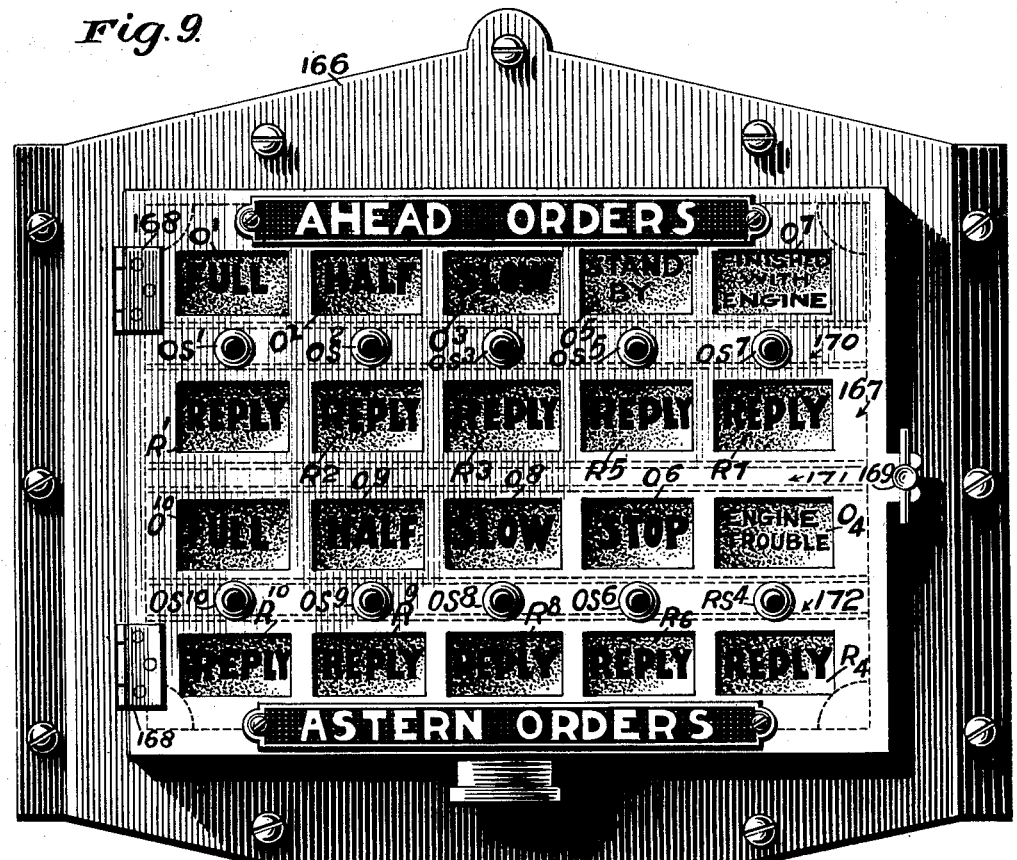
Figure 10:
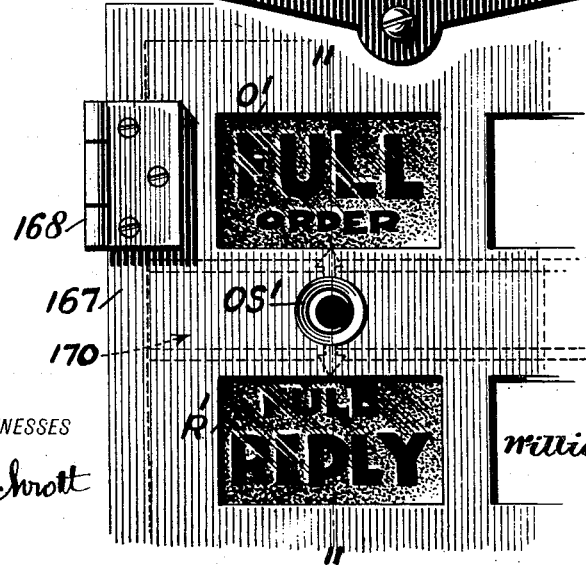

Figure 1 is a diagram illustrating the various circuits of the ship telegraph. three transmitting instruments or "order" stations and one receiving station being shown, Figure 2 is a diagram illustrating the actions that take place on initially closing the main switch at the bottom, Figure 3 is a diagram illustrating the actions that take place when the engineer replies to the "stand-by" order which is rendered prominent on initially closing the main switch, Figure 4 is a diagram illustrating the actions that take place when one of the operators actuates the "slow" order, Figure 5 is a diagram illustrating the actions that take place when the engineer replies to the "slow" order, Figure 6 is a diagram illustrating the actions that take place when the engineer apprises all "order" stations of engine trouble, Figure 7 is a detail view of the mechanism of one of the transmitting instruments or "order" stations, also showing the cooperating relays which are common to the whole telegraph, Figure 8 is a detail view of the receiving instrument in the engine room, Figure 9 is a front elevation of one of the transmitting instruments showing the arrangement of the push buttons of the "order" switches and the corresponding orders, Figure 10 is a detail view of one of the "order" compartments, Figure 11 is a detail vertical section on the line 11—11 of Figure 10, Figure 12 is a horizontal section on the line 12—12 of Figure 11, and Figure 13 is a detail view of one of the relays.

In order that the reader may obtain a clear and connected understanding of the ship telegraph, the following specification begins with a description of the general construction, proceeding with the descriptions of the actions taking place on initially energizing the telegraph system, sending the "slow" order, replying to the "slow" order, sending the "engine trouble" order from the engine room, and concluding with a résumé of the features of advantage of the invention. To further aid in the understanding of the construction and in following the accompanying reading matter, attention is directed to this:

*Schedule of symbols.*

SB—Signal battery or positive line wire.
C—Common return or negative line wire.
O—Order indication.
R—Reply indication.
OS—Order switch.
RS—Reply switch.
OC—Order common or negative return wire.
RC—Reply common or negative return wire.
A—Busses or main lines.
Z—Relay solenoids.
S—Solenoid "stick" control circuit.
N—Current controlling contactors or relay "jumpers,"
M—"Stand by" circuit.
OB—Order bell.
E—Engine room reply wire.
H—Restoring wire.
Q—Time recording means.

The general construction of the improved ship telegraph is diagrammatically but clearly illustrated in Figure 1, to which attention is first directed. In the normal operation of the telegraph, current is supplied by a suitable generator over the positive wire 1, returning over the negative wire 2. When the current thus flows, the suitably wound magnet 3 is energized, attracting the contactors 4, 5 of the associated switch, conducting the current to the main positive line wire SB and enabling the current to return over the common negative wire C.

The switch structure thus partially described, and illustrated at the right of Figure 1, is what may be termed for convenience, a "no voltage release". The position of the device shown, illustrates the current from the generator as having failed, whereupon the contactors 4, 5 drop to the lowermost position and engage suitably arranged contacts of positive and negative wires 6, 7 leading to a storage battery of a suitable type. This provision makes it possible to keep the telegraph in operation even should the current from the main source, i. e., the generator, fail. Suitable fuses 8 are interposed in the wires SB and C, as shown, for purposes of protection.

A plurality of transmitting stations is shown, these being respectively indicated 9, "the navigating bridge", 10, "the flying bridge", and 11, "the wheel house". Although but a single receiving instrument 12 is shown, any number of such receiving instruments may be used in the engine room of the ship.

Since all of the transmitting instruments 9, 10 and 11 are the same in construction and operation and only the receiving instrument 12 is different, but one transmitting instrument is described below and illustrated in connection with the receiving instrument in Figures 2 to 6 of the drawing. Reference is now directed to Figure 7 in which one of the transmitting instruments, for example, the instrument 9 on the navigating bridge, is shown in detail.

Located at the top is the order bell OB to which the positive line wire SB is connected at one side, the other side being connected to the order common wire OC by means of the wire 13. Ten order indications $O^1$, $O^2$, $O^3$, $O^4$, $O^5$, $O^6$, $O^7$, $O^8$, $O^9$, and $O^{10}$ are connected at one side to the wire OC, the other side of the order indications being connected to the busses $A^1$, $A^2$, $A^3$, $A^4$, $A^5$, $A^6$, $A^7$, $A^8$, $A^9$, and $A^{10}$ by wires 14, 15, 16, 17, 18, 19, 20, 21, 22 and 23.

Arranged in parallelism with the busses or main wires just indicated, are busses RC, OC, SB, H' and E'. The busses OC and SB will be recognized as being the continuations of the wires OC and SB described above, by reason of the connections thereto, as shown. Running parallel with the wire OC is the reply common wire RC, which is really a continuation of the bus RC by virtue of the connection 24.

A plurality of switches 25, one for each wire running to the various busses, and also a single pole double throw switch $25^a$, is provided for each wire in the main or control circuit. The double throw switches are to be so constructed that immediately upon opening one side of the switch, the other side will close. This insures an unbroken main circuit.

Arranged beneath the respective order indications $O^1$, $O^2$, etc., are companion reply indications $R^1$, $R^2$, $R^3$, $R^4$, $R^5$, $R^6$, $R^7$, $R^8$, $R^9$, and $R^{10}$. All of the order and reply indications consist preferably of lamps as shown in Figure 11, but obviously may consist of any other device or devices suitable for the purpose. These various indications are connected in parallel across the order common and reply common wires OC and RC, the various wires 14, 15, 16, etc., being connected in the middle, supply current to the various indications under circumstances that are described in connection with operations Nos. 1 and 2 in Figures 2 and 3 of the drawing.

The order indications $O^1$, $O^2$, etc., are lighted when an order is being transmitted from one of the order stations, and the reply indications $R^1$, $R^2$, etc., are lighted when the particular order given is replied to by the receiver in the engine room. The restoring wire H is connected to the bus H', an extension of the main positive wire SB, divided into branches 26, 27, 28, 29, 30, 31, 32, 33 and 34, running in parallelism with the wire H as clearly shown in Figure 7.

Operatively associated with the wires H and positive branches 26, 27, etc., are the order switches $OS^1$, $OS^2$, $OS^3$, $OS^5$, $OS^6$, $OS^7$, $OS^8$, $OS^9$, and $OS^{10}$, which are individually depressible by the officer at the station to transmit that particular order represented by the order switch then actuated. Each order switch includes a back point and a pair of front points, the back point, against which the respective order switches rest normally, being indicated 35, 36, 37, 38, 39, 40, 41, 42 and 43.

Those of the front points connected to the restoring wire H are indicated 44, 45, 46, 47, 48, 49, 50, 51 and 52, while those connected to the respective wires 14, 15, etc., are indicated 53, 54, 55, 56, 57, 58, 59, 60, 61 and 62.

In the normal position of the parts, as in Figure 7, a current path is completed from the positive wire SB through the various branches 26, 27, 28, etc., to the last order switch $OS^{10}$, by reason of the normal contact of the various order switches with the respective back point of the branch wires. The back point 43 alone performs no function, in that it is merely a stop point for the switch $OS^{10}$ and is not connected to any wire as is the case with the preceding back point.

One of the switches in the series of order switches just described, namely, the reply switch $RS^4$, is slightly different in construction from the order switches at either side. This switch $RS^4$ is connected through the wire 63 to the engine room reply bus E' in contra-distinction to the connections of the other switches to branch leading to the wire SB. The switch $RS^4$ has but a single front point 56 which is connected to the wire 17. The purpose of the switch $RS^4$ is for the reply or acknowledgment of the order "engine trouble" by the officer at the order station, while all the other switches are only for transmitting orders to the engine room.

There is a plurality of order controlling relays, each corresponding to a companion one of the respective order indications tabulated below and accordingly designated $Z^1$, $Z^2$, $Z^3$, $Z^4$, $Z^5$, $Z^6$, $Z^7$, $Z^8$, $Z^9$ and $Z^{10}$. The solenoids of the relays $Z^1$ to $Z^{10}$ are respectively energized upon transmission of an order corresponding to the depression of a particular companion order switch OS. The end relay $Z^{11}$ is not subject to control by the order switches OS, but is controlled only by the reply switches RS in the engine-room instrument.

The solenoids of the respective relays $Z^1$, $Z^2$, etc. to $Z^{10}$, are connected at one side to the common wire C and at the other side to the busses $A^1$, $A^2$, etc., to $A^{10}$ through the wires 64, 65, 66, 67, 68, 69, 70, 71, 72 and 73. One side of the solenoid of the relay $Z^{11}$ is also connected to the common negative return wire C, while the other side is connected through the wire 74 to the engine room reply wire E'.

Each solenoid $Z^1$, $Z^2$, etc. to $Z^{11}$ has a movable core 75, 76, 77, 78, 79, 80, 81, 82, 83, 84, 85, each of the various cores including a plurality of circuit controlling contactors or disks. The structure of one of the relays is shown in detail in Figure 13, this being the relay $Z^2$. The disk, correctly shown as such, on the movable core 76, cooperates with the front and back points at the sides, but for purposes of clearness of illustration, these disks are shown as plain contactors in the diagrammatic drawings.

Arranged in horizontal series are the contactors of the S circuit, which are respectively designated $S^1$, $S^2$, $S^3$, $S^4$, $S^5$, $S^6$, $S^7$, $S^8$, $S^9$, $S^{10}$ and $S^{11}$. These normally rest against back points or contacts of connecting wires 86, 87, 88, 89, 90, 91, 92, 93, and 94, the wire 94 being connected to the armature $S^{10}$ which merely rests against a dead back point and has no connection to the contactor $S^{11}$, which also merely rests against a dead back point.

Front points 95, 96, 97, 98, 99, 100, 101, 102, 103, 104 and 105 are engageable by the companion contactors $S^1$, $S^2$, etc. to $S^{11}$, when the respective solenoids $Z^1$, $Z^2$ etc. to $Z^{11}$ are individually energized, thereby supplying what is so termed for convenience of description, "stick" energy to that particular solenoid previously energized by the depression of its corresponding order switch, from the branch wire 106 which is capable of positive energization.

"Stick" energy is supplied to the solenoid $Z^{11}$ by a wire 107 which runs from the branch 106 to the contactor $S^{11}$. Normally, no current flows through either the wire 107 or over the "stick" circuit S by reason of the positions of the contactors of the N circuit. These contactors are arranged in a double row, and in accordance with the direction of flow of the current from right to left as will appear below, are designated $N^1$, $N^2$, $N^3$, $N^4$, $N^5$, $N^6$, $N^7$, $N^8$, $N^9$, $N^{10}$, $N^{11}$, $N^{12}$, $N^{13}$, $N^{14}$, $N^{15}$, $N^{16}$, $N^{17}$ and $N^{18}$.

A wire 108 connects the front point of the contactor $N^2$ to the back point of the contactor $N^{11}$, and incidentally it should be here noted that throughout the drawing, front contact points are to be distinguished from back contact points by the engagement of the contactors or switch arms with the back point in the normal positions of the parts. Wires 109, 110, 111, 112, 113, 114, 115, and 116 connect the respective contactors $N^2$, $N^3$, etc. $N^9$ with the front points of the companion contactors in horizontal order. For example, the contactor $N^2$ is connected by the wire 109 with the front point of the contactor $N^3$, and so on across.

A branch 117 connects the wire 108 to the back point of the contactor $N^1$, a wire 118 connecting the front point of the same contactor to the branch connection joining the front and back points of the contactors $N^2$ and $N^{11}$. Wires 119, 120, 121, 122, 123, 124, 125 and 126 connect contactors $N^{11}$, $N^{12}$, etc. $N^{18}$ to the back points of contactors $N^3$, $N^4$, etc. $N^{10}$, all of these back points being in turn connected to the front points of the contactors $N^{11}$, $N^{12}$, etc. $N^{18}$, by short branches.

The back points of contactors $N^{12}$, $N^{13}$, etc. $N^{18}$ are connected to the wires 109, 110, etc. 115 by wires 127, 128, 129, 130, 131, 132, and 133. The M or "stand by" circuit comprises a horizontal series of contactors $M^1$, $M^2$, $M^3$, $M^4$, $M^6$, $M^7$, $M^8$, $M^9$, and $M^{10}$, wires 134, 135, 136, 137, 138, 139, 140 and 141 connecting the back points of the various contactors to the contactors next in order. For example, the back point of contactor $M^1$ is connected by the wire 134 to the contactor $M^2$ and so on across with the exception of the contactor $M^{10}$, in which case the wire 141 joins the two adjacent back points, the contactor itself being connected by means of the wire 142 to the bus $A^5$.

A positive branch wire 143 runs from the main positive line wire SB to the contactor $N^1$ of the relay $Z^{10}$, by this manner of connection supplying current to the N circuit and the S circuit when one of the relays $Z^1$, $Z^2$ etc. $Z^{10}$ is actuated to properly position the companion contactors thereby shifted to close the N circuit. Current is supplied to the M circuit through the wire connection of the contactor $M^1$ to the branch wire 143.

The Q or time-recording circuit comprises the contactors $Q^1$, $Q^2$, $Q^3$, $Q^4$, $Q^5$, $Q^6$, $Q^7$, $Q^8$, $Q^9$, $Q^{10}$ and $Q^{11}$, which are all connected to the positive branch wire 143 and respectively have brush contacts 144, 145, 146, 147, 148, 149, 150, 151, 152, 153 and 154, by means of which momentary contacts are made and the time of operation of the then active companion relay in both directions, recorded on suitable recording means more fully described below.

Of the contactors in the Q circuit, the contactor $Q^{11}$ is the only one which has no connection to the branch 143, this contactor being connected to the wire 74 by the branch 155, to which the back point 105 of the contactor $S^{11}$ is also connected. The retractor contactor 156, in horizontal line with the top row of contactors of the N circuit but having no operative connection therewith, is joined through the wire 157 to the retractor solenoid $Z^{12}$ at the other end of the core 85 of the relay $Z^{11}$.

Upon subsequent depression of one of the order switches OS after a previously given order has been transmitted to the engine room and in turn acknowledged by the engineer, (by which act of acknowledgment the relay $Z^{12}$ becomes energized,) a circuit is momentarily completed through the retractor solenoid $Z^{12}$, because the contactor 156 is then in engagement with the front point to which the wire 158 leads from the bus H', the return path of the current from the solenoid $Z^{12}$ being over the wire 159 to the common negative return C.

A contactor 160 controls the return current over the wires 161 or 162 which respectively terminate in back and front contact points at the contactor. The wire 161 is connected to the common return OC, while the wire 162 is connected to the common return RC. The up and down movement of the contactor 160 causes the lighting and extinction of the order and reply indications O and R, as appears more fully below.

Main switches $MS^9$, $MS^{10}$ and $MS^{11}$ are so located as to be individually operative at the respective transmission stations 9, 10 and 11, these switches also being embraced by the main positive wire SB as clearly shown in Figure 1. These main switches are respectively 3-way, 4-way and 3-way, the arrangement being such that the current can be turned on by merely operating any one of the switches at any one of the stations. Attention is directed to the detail construction of the main switches $MS^9$, $MS^{10}$ and $MS^{11}$. Although these are shown diagrammatically in Fig. 1, the essential details are illustrated very clearly so that the reader may understand the operation.

The switch $MS^9$ comprises four upstanding metallic strips 191 which respectively have contacts 192, 193, 194 and 195. A contact arm 196 is adapted to engage opposite ones of the contacts so as to provide a current path to the wire SB either by way of a wire 197 or 198. The contact arm 196 is operated by a knob 199. The wire 197 has connection at one end with the strip which carries the contact 193 while the wire 198 has connection at one end with the strip that carries the contact 194.

Reference is next had to the switch $MS^{11}$ which is of a construction identical with the switch $MS^9$. The switch $MS^{11}$ is composed of four upstanding metallic strips 200 which respectively have contacts 201, 202, 203 and 204. Opposite ones of these are adapted to be engaged by the contact arm 205 which is operated by a knob 206. The main current wire SB has connection with the strips 200 which carry the contacts 202 and 203. One end of a wire 207 has connection with the strip which carries the contact 201, and similarly, one end of a wire 208 has connection with the strip which carries the contact 204.

The construction of the main switch $MS^{10}$ is different from the two switches just described in that it is a 4-way switch and the other are 3-way switches. Where more than two stations are used in a signalling system, each intermediate station should have a 4-way switch corresponding with the switch $MS^{10}$.

This switch has four contact strips 209 which, like the strips in the switches $MS^9$ and $MS^{11}$, are set 90° apart. Each of the strips 209 carries two sets of contacts, one being situated in a plane above the other. The contacts in the upper plane are 210, 211, 212 and 213. The contacts in the lower plane are 214, 215, 216 and 217. Contact arms 218 and 219 are adapted to connect adjacent contacts in the respective upper and lower sets of contacts.

These arms are carried by an insulating pin 220 which carries a knob 221 by means of which the contact arms are turned. The wire 197 is connected to that strip 209 which carries the contact 211, the wire 198 is connected to the strip which carries the contact 213, the wire 207 to the strip carrying the contact 210 and the wire 208 is connected to the strip carrying the contact 212. Assuming the current to be on, a quarter turn of any one of the switches cuts it off. Assuming the current to be off, the operation of any one of the switches will turn the current on. The arrangement of the switches therefore makes it possible to fully control the main energizing current from any one of the stations.

The receiving instrument in the engine room is to be considered next. It is shown in detail in Fig. 8, wherein parts corresponding in construction and operation to similar parts in the transmitting instruments, of which the first one is described above in connection with Figure 7, are to be recognized by similar reference characters. A difference in the receiving instrument over the transmitting instruments consists of the provision of a plurality of reply switches respectively designated $RS^1$, $RS^2$, $RS^3$, $RS^5$, $RS^6$, $RS^7$, $RS^8$, $RS^9$, and $RS^{10}$. The purpose of these switches is to enable the engineer to reply to or acknowledge orders transmitted to him.

The engineer can transmit only one order, i. e. "engine trouble", by means of the order switch $OS^4$, the circuit connections of which are so arranged that precedence is given over any order then up on any board.

The order switch $OS^4$ has a front point 163, in association with the front point 56, which is connected to the bus H' by the wire H. The order switch $OS^4$ also has a direct connection to the main positive wire SB through the wire 164. Attention is next directed to the detailed description of one transmitting instrument, illustrated in Figures 9, 10, 11 and 12. The mechanism is contained in a suitable casing 165, preferably made of metal, provided with a suitable flange 166 by means of which the casing is attached in a convenient position, and having a door 167 suitably arranged to make an air and water-tight closure. The door is hinged at 168 and has suitable clamping means 169 through which the door is firmly clamped over the opening of the casing. There are twenty openings in the door 167, corresponding in number to the order and reply indications in Figure 7. Strips or portions 170, 171 and 172 separate and define the various openings vertically, the portions 170, 172 providing the necessary support for mounting the order switches $OS^1$, $OS^2$, $OS^3$, $OS^5$, $OS^7$, $OS^{10}$, $OS^9$, $OS^8$, $OS^6$ and $RS^4$. The upper row of five of these switches is associated with the following indications under the legend "*Ahead orders.*"

O¹—Full.
O²—Half.
O³—Slow.
O⁵—Stand by.
O⁷—Finished with engine.

Each of the above orders has a corresponding reply indication R¹, R², R³, R⁵ and R⁷. The remaining order and reply indications are located in the lower path of the door 167 above the legend "*Astern orders.*"

O¹⁰—Full.
O⁹—Half.
O⁸—Slow.
O⁶—Stop.
O⁴—Engine trouble.

Each of these orders has the corresponding reply indications R¹⁰, R⁹, R⁸, R⁶ and R⁴, the various order and reply indications being painted or otherwise applied to the translucent panes 173 in the openings in the door.

Prominence is given that particular order represented by the order switch depressed by the operator, by the lighting of the lamp behind the opening bearing the order legend then in operation. One or more lamps can be placed behind each legend, only one lamp being shown, however, in each case in Figure 11.

Electro-magnets 174, 175 are placed in circuit with the order and reply indication lamps O¹, R¹, (Fig. 7) so that when the respective lamps are lighted the companion electro-magnets are energized to attract the armature 176 of the pointers 177, 178. The pointers are resiliently mounted at 179, the pointers in fact being a part of the resilient strip 179.

If, for example, the order O¹ is brought into prominence by lighting of the lamp, the magnet 174 will be energized attracting the armature 176 and elevating the pointer 177 to more clearly designate the "full" order. The order switches, of which Figure 12 shows the detail construction comprises the front contact points 44 and 53 and the back contact point 35 as described in connection with the first unit in Figure 7, and comprises the arm OS¹ which is rigidly mounted in an insulating bushing $v$ (Fig. 12.) The switch arm is flexible and capable of being pushed by the button $w$, which is reduced at $x$ to produce a shoulder for the purpose. The reduced shank $x$ acts as a guide for the button, and also as a mounting for a coil spring $y$ which assists in keeping the switch arm in normal engagement with the back point 35. The switch structure is preferably enclosed in an air-tight casing 180, because the main current is not broken by these switches.

One relay Z is shown in detail in Figure 13. This is the relay Z², arbitrarily selected from the bank of relays in Figure 7. All of the relays are substantially alike, it being noted, however, that the relay Z⁵ in Figure 7 is minus a contactor in the M or "stand by" circuit, the purpose of this omission being to prevent the breakage of the M circuit when the relay Z⁵ is automatically energized by the initial closure of one of the main switches MS⁹, etc. the M or "stand-by" circuit is normally closed.

The solenoid Z² of the relay in Figure 13 is suitably vented at 181, in accordance with approved modern construction, and is contained in an insulated case 182. This case may be surrounded by a strap of iron 182ª, all mounted on top of the contact housing 183, in which the various contacts and contactor disks are located. In the actual construction of the relay, as in Figure 13, the contactors S², N⁹, N¹⁸, M² and Q², designated as such for convenience of illustration, consist of disks bearing the same reference characters, and affixed to the core 76 of the solenoid.

Each disk has cooperating front and back points collectively designated 184, and 185, with the exception of the front point of the disks S² and Q², the front points of which have been referred to above as 96 and 145, respectively.

The front and back points consist of resilient contact strips which are respectively fastened at 186, 187 to the casing 183 at each side of a common stop 188 between said contacts. The arrangement of the front and back points makes a novel form of contact breaker, it being understood at once that considering the core 76 to move upwardly, the back points 185 at each side will follow the disk S² until the stops 188 are reached, whereupon the disk S² will have but a short distance to travel before the front points 96 are engaged. The relay Z² is removed from the companion order switch OS², and therefore removes the places where the main current is broken, it naturally following that the order switches OS of the transmitting instruments can be housed in air-tight casings because the escape of gases attending circuit breaking will not have to be provided for in said instruments.

A spring 189, or other equivalent means, is attached to the lower end of the core 76 so as to retard the upward movement thereof when the solenoid Z² is energized, but to hasten the return of the core when said solenoid is deenergized. The relays Z are therefore retarded in picking up but are quick in returning. The retractor solenoid $Z^{12}$ in Figure 7, is merely an auxiliary to the spring 189, insuring the return of the core should the companion spring fail to make the return. If desired, both springs and retractor solenoids may be employed in connection with each of the relays Z. The spring 189 in Figure 13, is adjustable in tension by the wing nut 190 at the bottom.

The operation comprises five major acts which are described below in regular order, beginning with automatically ordering the "stand by" indication. Consider Figure 2. In this figure, and in Figures 3, 4, 5, and 6 following, the active lines and devices are indicated in heavy lines. Normally, the entire system is "dead," that is to say, current flows on none of the lines. The officer on the navigating bridge 9 turns the main switch $MS^9$ of that transmitting instrument, whereupon current flows from the positive pole of the source of energy over the main line wire SB, including the bus SB, continuing up and ringing the order bells OB on the navigating bridge and in the engine room, returning via the order common wires OC to the bus OC, over wire 161 to the back point of contactor 160 and over wire 159 to the common negative return wire C to the negative pole of the source of energy. All order bells OB throughout the system are now ringing. Refer to Fig. 1. Before turning the switch $MS^9$ the switch arms 196, 218, 219 and 205 are assumed to be standing in the respective positions shown. Attempting to trace a current path to the left from the line wire SB at the right, the reader will find the circuit to be broken at the contact 194 of the switch $MS^9$. By turning the knob 199 of the switch $MS^9$ the following circuit is established: Wire SB (at the right), contact 202, arm 205, contact 204, wire 208, contact 216, arm 219, contact 217, wire 198, contact 194, arm 196, contact 191, and out to the wire SB at the left, and so on to the mechanism described in the preceding paragraph and back to the common negative return wire C. The position then assumed by the switch $MS^9$ is shown in Fig. 2.

The reader will readily see that a quarter turn of any one of the switches, assuming the switch $MS^9$ to be in the position in Fig. 2, will again break the continuity of the circuit. This is true whether the switch $MS^{10}$ or the switch $MS^{11}$ be turned. The next quarter turn of the switch $MS^9$, or any other switch, will turn off the current, and so on alternately.

Current enters the branch 143 from the main line wire SB, flowing over the normally closed M circuit comprising the contactors $M^1$, $M^2$ etc. $M^{10}$, reaching the wire 142 and flowing to the bus $A^5$, from thence flowing over all wires 18 to the order indications $O^5$ and returning to the negative pole of the source of energy over the order common wire OC, bus OC, wire 161, contactor 160, wire 159 and the common negative return C. All order indications $O^5$ are now energized throughout the system and the order "stand by" is rendered prominent by reason of the lighting of the lamps therebehind. The engineer is thus admonished to pay attention and wait for an ensuing order.

Energization of the bus $A^5$, as described above, causes the energization of the solenoid $Z^5$, current flowing over the wire 68, through the solenoid and returning via the negative return wire C. The core 79 is thus attracted, lifting the contactors $S^5$, $N^6$, $N^{16}$ and $Q^5$ from contact with the respective back points into engagement with the various front points. The contactor $Q^5$ operates to mark the time of lifting of the core 79 by virtue of the operatively associated time recording mechanism.

This mechanism is conventionally shown in connection with the relay $Z^1$ in Figure 1 and comprises a clock-rotated paper dial $d$ on which the time of giving an order and replying thereto, is impressed by markers $m$, $m'$. These are mounted on the contactor $a$. When the magnet $m^2$ is energized by the operation of the relay, the marker $m'$ records the time, and when the relay and magnet $m^2$ are deenergized, the marker $m$ records the time.

The N circuit is energized by the lifting of the contactor $N^6$, current flowing from the positive pole of the source of energy over wire SB to branch 143 and over this path: contactor $N^1$, wire 117, wire 108, contactor $N^{11}$, wire 119, contactor $N^3$, wires 110, 128, contactor $N^{13}$, wire 121, contactor $N^5$, wire 112, contactor $N^6$, wire 131, contactor $N^{16}$, wire 124, contactor $N^8$, wire 133, contactor $N^{18}$, wire 126, and contactor $N^{10}$ to wire 106, from thence flowing over the contactors $S^1$, $S^2$, $S^3$, $S^4$ and $S^5$ of the "stick" circuit to the front point 99, through solenoid $Z^5$, back to the negative pole of the source of energy over the common negative return C. "Stick" energy is thus supplied to the solenoid $Z^5$ so that the core 79 remains up and the various contactors associated therewith remain in the position shown in Figure 2, until another order is issued from a transmitting instrument. The order bells OB are still ringing and all order indications $O^5$ ("stand by") are still lighted.

The engineer's reply stops all order bells ringing and extinguishes all order indications $O^5$, but lights all reply indications $R^5$, thus constituting the acknowledgment of the "stand by" order. Consider Figure 3. In replying, the engineer presses the reply switch $RS^5$, whereupon current flows from the bus $A^5$ (which is still energized by virtue of the flow of current from the positive pole of the source of electrical energy, over wire SB, branch 143, the contactors M¹, M² etc. M¹⁰ of the M circuit, and wire 142) over wire 18 to the front point 57, through switch RS⁵ to the engine room reply wire E, bus E', wire 74 to the solenoid Z¹¹, and from thence to the negative pole of the source of energy via the common return C. The solenoid Z¹¹ being thus energized, attracts the core 85 consequently lifting the contactors S¹¹, 156, 160 and Q¹¹ into engagement with the respective front points. The contactor Q¹¹ makes record of the time of lifting of the core by virtue of its association with the time recording mechanism.

All order bells are silenced and all order indications O⁵ are extinguished by the lifting of the contactor 160 at the depression of the reply switch RS⁵, since the formerly active order common return wire OC is now broken at the back point of the wire 161, thus severing return communication of the current to the common negative return wire, from the order common wire OC connected to the indications O⁵ and order bells OB. Also, upon depression of the reply switch RS⁵, current flows over the wire 18, past the front point 57, through the reply indication R⁵ in the engine room instrument, over the reply common wire RC, wire 24 to the bus RC, wire 162 to the front point of contactor 160, through the contactor and over the wire 159 to the negative pole of the source of energy via the common return C. Current flows in the same way through the reply indications R⁵ of all of the instruments in the entire system, said indications remaining lighted until a following order is given, by this means:

"Stick" energy is supplied to the solenoid Z¹¹ to keep the core 85 up and the contactor 160 in contact with the front point of the wire 162, thereby keeping the return path of the current from the reply indications R⁵, via wires RC, 24, bus RC, wire 162, contactor 160, wire 159 and common return C, integral after the reply switch RS⁵ is released by the engineer. This "stick" energy for the solenoid Z¹¹ flows from the positive pole of the source of energy, over wire SB, branch 143, the various contactors and wires of the N circuit described in connection with Figure 2, finally reaching the wire 106, from thence flowing over the wire 107 to the contactor S¹¹ to the front point 105, through solenoid Z¹¹ back to the negative pole of the source of energy via the common return C. The solenoid Z⁵ is still energized from the initial operation of issuing the "stand by" order through the act of turning the main switch MS⁹, and consequently the N circuit remained complete for the passage of current to the "stick energy" wire 107, as just described.

The "slow" order is issued from the transmitting instrument on the navigating bridge 9, or any other transmitting instrument throughout the ship, by depressing the order switch OS³ (see Figure 4), whereupon the following actions take place substantially simultaneously: (1) The solenoid Z³ is energized, (2) all order indications O³ and all order bells OB through the ship are lighted and rung, (3) the "stick" circuit S for solenoid Z⁵ is broken, (4) the N circuit is momentarily broken to deenergize the solenoid Z¹¹, and (5) the solenoid Z¹² is momentarily energized to retract the core 85.

(1) Upon depressing the order switch OS³, so that the switch rests against the front points 55, 46 current flows from the positive pole of the source of energy over the positive main line wire SB to the switch OS³ over the branches 26, 27 and 28 in Figure 7, over the front point 55 to the wire 16, energizing bus A³ throughout the system, continuing down wire 66 to the solenoid Z³, and back to the negative pole of the source of energy via the common return wire C. The solenoid Z³ is thus energized and the core 77 is raised.

(2) Current also flows in an upward direction over the wire 16 of the transmitting instrument on the navigating bridge, through the lamp of the order indication O³ over the wire OC to the bus OC, returning to the negative pole of the source of energy via the wire 161, contactor 160, wire 159 and the common negative return wire C. This return passage of the current is made possible by the restoration of the return contact contactor 160 as appears under headings (3) and (4). The bus A³ having been energized throughout the system, current flows over all wires 16, to all order indications O³, returning to the negative pole of the source of energy via the wires OC etc., as just described. All order indications are now rendered prominent throughout the system, and all order bells are ringing.

(3) Up to the time of the depression of the switch OS³, the relays Z⁵ and Z¹¹ are energized, so that the associated parts thereof were in the dotted line positions in Figure 4. The "stick" circuit S, which supplied current for the energization of the solenoid Z⁵, is broken at the back point of the contactor S³ of the relay Z³ when the core 77 is raised. "Stick" energy for the solenoid Z³ now flows from the positive pole of the source of energy, over wire SB to the branch 143 and then over the contactors and wires of the N circuit as follows: wire 143, contactor N¹, wire 117, wire 108, contactor N¹¹, wire 119, contactor N³, wire 110, wire 128, contactor N¹³, wire 121, contactor N⁵, wire 112, wire 130, contactor N¹⁵, wire 123, contactor N⁷, wire 114, contactor N⁸, wires 115, 133, contactor N¹⁸, wire 126, and contactor $N^{10}$ to the wires 106 and from thence over the contactors $S^1$, $S^2$, $S^3$, front point 97 through the solenoid $Z^3$ to the common negative return C and then back to the negative pole of the source of energy.

It is to be observed that the path of the current through the N circuit is the same in Figure 4 as in Figure 2 until it reaches the relay $Z^5$, where it is shunted from passage through the contactor $N^6$ to passage through the contactor $N^{15}$, by reason of the deenergization of the solenoid $Z^5$, explained above. The N circuit would be broken were it not for the picking up of the contactor $N^8$ of the relay $Z^3$, which act again completes the N circuit so that current is conducted to the solenoid $Z^3$, holding the core 77 up and thereby keeping the bus wire $A^3$ energized until the engineer replies to the order $O^3$ ("slow").

The bus $A^5$, which up to the time of the depression of the order switch $OS^3$ supplied energy for the lighting of the reply indications $R^5$ in Figure 3, is deenergized or severed from communication with the positive pole of the source of energy, by the lifting of the contactor $M^3$ from the back point of the wire 136, at the raising of the core 77. The M circuit being broken at this point, current no longer flows to the bus $A^5$ and consequently the reply indications $R^5$ are extinguished.

(4) The momentary breaking of the N circuit at the contactor $N^6$ upon the deenergization of the solenoid $Z^5$ and consequent return of the core 79, caused the deenergization of the solenoid $Z^{11}$ so that the core 85 returned to the original position. This return of the core 85 also breaks the return path of the current from the reply indications $R^5$ in Figure 3 at the contactor 160.

(5) In case the core 85 should for any reason stick upon deenergization of the solenoid $Z^{11}$, and thereby fail to shift the various contactors $S^{11}$, 156, 160 and $Q^{11}$ to the original positions, the solenoid $Z^{12}$, at the bottom operates to positively retract the core. This solenoid is energized by the passage of current from the positive pole of the source of energy, over wire SB, branches 26, 27 and 28, to the switch $OS^3$, front point 46, over restoring wire H, bus H', wire 158, contactor 156, wire 157, through the solenoid $Z^{12}$, returning to the negative pole of the source of energy via wires 159 and C. As stated before, the solenoid $Z^{12}$ is added merely as a precautionary measure, so that in case the spring 189 at the bottom of the core should fail to function, the solenoid $Z^{12}$ will insure the return of the core.

The officer on the navigating bridge 9 has by this time released the order switch $OS^3$, but the solenoid $Z^3$ is still energized, the core 77 is still raised, all order bells OB are still ringing, and all order indications $O^3$ ("slow") are still prominent throughout the system. The engineer must now reply to the "slow" order. Consider Figure 5. The engineer makes his reply by depressing his reply switch $RS^3$, whereupon: (1) The solenoid $Z^{11}$ is energized and actuated to silence all order bells and extinguish all order indications $O^3$, (2) all reply indications $R^3$ are lighted, and (3) "stick" energy is supplied to solenoid $Z^{11}$ and relay $Z^3$ remains up.

(1) The engineer presses the reply switch $RS^3$ so that it engages the front point 55, whereupon current flows from the positive pole of the source of energy over the main positive line wire SB, branch 143, the contactors and wires of the N circuit designated in Figure 5 and described in connection with Figure 4, finally reaching the wire 106 and from thence flowing over the S circuit comprising contactor $S^1$, wire 86, contactor $S^2$, wire 87, contactor $S^3$, front point 97, wire 66 to the bus $A^3$, from thence up the wire 16 to the front point 55, over switch $RS^3$, wire E, bus E', wire 74, through solenoid $Z^{11}$ and back to the negative pole of the source of energy via the common return wire C. The solenoid $Z^{11}$ being thus energized, attracts the core 85 so that the contactor 160 no longer rests on the point of the wire 161, thereby maintaining the return path for the current flowing from the order indications $O^3$ and order bells OB in Figure 4, but now engages the front point of the wire 162 so that the current flows thus:

(2) From the positively energized bus $A^3$ (which receives current from the positive pole of the source of energy, over wire SB, branch 143, the contactors and wires of the N circuit, wire 106, the contactors and wires of the S circuit, wire 66 to bus $A^3$) over wire 16 to the reply indication $R^3$, returning via the negative return wire 24 to the bus RC, down wire 162, over contactor 160 and returning to the negative pole of the source of energy via the wires 159 and the common return C. Current is supplied in the same manner from the bus $A^3$ to all reply indications $R^3$, so that these alone are visible throughout the ship and thus indicate the engineer's reply to the previous order given in Figure 4.

The act of shifting the contactor 160 thus causes the silencing of the order bells OB and the extinction of all order indications $O^3$, and the lighting of all reply indications $R^3$. The time of operation of the relay $Z^{11}$ is recorded by the raising of the contactor $Q^{11}$ at the lower end of the core 85, this time recording act being accomplished at the raising of each one of the cores of the various relays.

(3) "Stick" energy for the solenoid $Z^{11}$ is supplied by the raising of the contactor $S^{11}$ into engagement with the front point 105, whereupon current flows from the positive pole of the source of energy, over the wire SB, branch 143, the contactors and wires of the N circuit, wires 106, 107 to the contactor $S^{11}$, front point 105, through solenoid $Z^{11}$, returning to the negative pole of the source of energy via the common return wire C. The cores of the relays $Z^3$ and $Z^{11}$ remain up until a subsequent order is issued, the energization of the solenoid $Z^3$ being necessary to maintain the circuit to the reply indications $R^3$ and the energization of the solenoid $Z^{11}$ being necessary to maintain the complete return path.

Should it happen that the engineer should fail to heed the "slow" signal after having replied by depressing his reply switch $RS^3$, the officer on the navigating bridge or on any of the other bridges, from whence the signal originated, can again depress his order switch $OS^3$ whereupon (1) all order indications $O^3$ and all order bells OB are made to again come into prominence and ring, and (2) the reply indications $R^3$ set up by the engineer, are extinguished. The second depression of the order switch $OS^3$ would cause current to flow from the positive main line wire SB, which leads to the positive pole of the source of energy, over the branch wires 26, 27 and 28 in Figure 7, to the switch $OS^3$, over front point 46, restoring wire H, bus H', wire 158, contactor 156, wire 157, solenoid $Z^{12}$, returning to the negative pole of the source of energy via wires 159 and C.

At this instant, both solenoids $Z^{11}$ and $Z^{12}$ are energized, but the solenoid $Z^{12}$ will predominate because of the retracting influence of the spring 189 at the bottom of the core 85. The core 85 will thus be pulled down and the contactor 160 disconnected from the front point of the wire 162 which leads to the reply common wire RC over which the current returns from the reply indications $R^3$ in Figure 5. Since this return path is now broken, the reply indications $R^3$ are extinguished, but a path is completed between the contactor 160 and the back point of the wire 161 so that the order indications $O^3$ are again lighted, current flowing thus:

(2) The bus $A^3$ being still energized by virtue of the passage of current from the positive pole of the source of energy over the contactors and wires of the N circuit, and the contactors and wires of the S circuit, front point 97 and wire 66 in Figure 5, will supply current to all order indications $O^3$ via wire 16 returning via the order common wires OC and bus OC over wire 161, armature 160 and returning to the negative pole of the source of energy via wires 159 and C. All order bells OB will also ring because of the completion of a path therefrom from the wire SB via the order common wires OC.

"The engine trouble" order is the only one that the engineer is capable of sending, and this order when issued from the engineer's receiving instrument will instantly register on all transmitting boards, taking precedence over any order that may be up. Consider Figure 6. The engineer presses his order switch $OS^4$, which it will be observed is like the order switches of the transmitting instruments but is unlike his reply switches in that the latter have only one front point whereas his order switch $OS^4$ has two front points. The depression of the order switch $OS^4$ (1) energizes the relay $Z^4$, (2) lights all order indications $O^4$ and rings all order bells OB, (3) momentarily breaks the N circuit to deenergize the relays $Z^3$ and $Z^{11}$, and (4) momentarily energizes the relay $Z^{12}$ to positively retract the core 85.

(1) $Z^4$ is energized by the flow of current from the positive pole of the source of energy over wire SB to the bus SB, wire 164, to the engineer's order switch $OS^4$, front point 56, down wire 17 to the bus $A^4$ which thus becomes energized throughout, over wire 67 to the solenoid $Z^4$, returning to the negative pole of the source of energy via the common return wire C. The solenoid $Z^4$ being energized, raises the core 78.

(2) The bus $A^4$, being energized and remaining so by virtue of the raised position of the core 78 of the solenoid $Z^4$ as appears more fully below, supplies current to all order indications $O^4$ as follows: from the positive pole of the source of energy over the wire SB to the branch 143, over the N circuit comprising contactor $N^1$, wires 117, 108, contactor $N^{11}$, wire 119, contactor $N^3$, wires 110, 128, contactor $N^{13}$, wire 121, contactor $N^5$, wires 112, 130, contactor $N^{15}$, wire 123, contactor $N^{16}$, wire 124, contactor $N^8$, wires 115, 133, contactor $N^{18}$, wire 126, contactor $N^{10}$ to wire 106, from thence flowing over the S circuit via the contactor $S^1$, wire 86, armature $S^2$, wire 87, contactor $S^3$, wire 88, contactor $S^4$, front point 98 and wire 67 to the bus $A^4$. From thence the current flows up all wires 17, through order indications $O^4$ ("engine trouble") returning via wires and bus OC, wire 161, contactor 160 and over wires 159 and C to the negative pole of the source of energy. All order bells OB are rung at the same time because of the passage of current from the wires SB to the order common wires OC.

(3) The passage of "stick" current through the solenoid $Z^3$ in Figure 5, was broken by the raising of the core 78 of the relay $Z^4$. This occurred upon the momentary opening of the N circuit at the contactor $N^7$ so that current could no longer flow over the remaining portion of this circuit to the solenoid $Z^8$, whence, being thus deprived of current, released the core 77, which dropped to the original position.

This momentary opening of the N circuit also deprived the solenoid $Z^{11}$ of "stick" energy, so that the core 85 had to drop, consequently opening the current return path from the reply indications $R^3$ at the armature 160, but establishing a return path for the current from the order indications $O^4$, as described above.

(4) The return of the core 85 was insured by the passage of current through the solenoid $Z^{12}$ when the engineer's order switch $OS^4$ engaged the front point 163, whereupon current flowed as follows: from the positive pole of the source of energy over wire SB, bus SB, wire 164, order switch $OS^4$, front point 163, restoring wire H, bus H', wire 158, contactor 156, wire 157, solenoid $Z^{12}$, returning to the negative pole of the source of energy via branch 159.

Attention is called to the fact that although there is a flow of current through all of the lamps R', $O^2$, $R^2$, etc., when $O^4$ (in Fig. 6, for example) is energized, the pointer 177 in Fig. 11 will nevertheless be attracted by the magnet 174 which is in parallel with the lamp $O^4$, thus disregarding the surplus energization of lamps R', $O^2$, $R^2$, etc. When $O^4$ in Fig. 6 is energized, current will flow from wire $A^4$, which is connected with the positive wire SB, to wire 17, lamp $O^4$, wire OC, wire 161 to armature 160, wire 159 to the negative wire C. Current will also flow from wire $A^4$ to wire 17, lamp $R^4$, and through any one of the pairs of lamps O' R', $O^2$ $R^2$, $O^3$ $R^3$, etc., in parallel to wire OC, wire 161 etc. to wire C. Lamp $O^4$ will burn brightly, while the illumination of lamp $R^4$ will depend upon the number of pairs of lamps connected across wires OC and RC. The other lamps will possibly glow dimly.

The features of advantage are here briefly summarized for the purpose of enabling a clearer conception of the invention. This summary also includes a brief résumé of the major operations.

1. The entire system is electrically energized so as to commence operations, by turning on any one of the main switches $MS^9$, $MS^{10}$ or $MS^{11}$ on the respective bridges or stations of the ship.

2. The "stand by" order $O^5$ is immediately flashed on the boards of all instruments on the ship by turning on the current at any one of the main switches, all order bells OB being rung at the same time. The engineer is thus admonished to watch for an ensuing order, and the officers on the remaining bridges are apprised of the fact that the telegraph system is in operation.

3. All "stand by" indications remain lighted and all order bells remain ringing until the engineer replies. When he does this, by depressing the corresponding reply switch $RS^5$, all "stand by" indications are extinguished and the order bells are silenced, at the same time lighting up all reply indications $R^5$ throughout the ship.

4. The issuing of a subsequent order from any one of the transmitting instruments, causes that order to appear on all of the instrument boards throughout the ship, extinguishing any order or reply that may then be in appearance and at the same time, ring all order bells so as to attract the attention of all concerned.

5. As in the first or initial instant, the order indications and order bells remain prominent and keep ringing until the engineer replies, whereupon the bells are again silenced and the last order indications are extinguished, and only the corresponding reply indications are lighted up.

6. The engineer can issue only the "engine trouble" order from his receiving instrument, and when he does so it becomes the duty of one of the officers to acknowledge the order so that the reply indication $R^4$ becomes visible all over the ship. This is the only order that the engineer can issue, and this order takes precedence over any order or reply that may be "up" on the instrument boards.

7. The wiring scheme provides great flexibility in the installation of the ship telegraph, in that as many instruments can be added as required, and this with a minimum amount of wiring.

8. Positive control of all order and reply indications is established by the series of relays $Z^1$ to $Z^{11}$. The relays $Z^1$ to $Z^{10}$ are actuated by the individual order indications on the respective instrument boards, but the relay $Z^{11}$ is actuated each time any one of the reply switches RS of the receiving instrument in the engine room is depressesd. The energization of one of the relays of the series $Z^1$ to $Z^{10}$, closes the N circuit, the simultaneous energization of two relays again opens this circuit, the energization of three relays again closes it, and so on.

9. Both the audible and visible signals are so dependent on the same circuits in order to function, that in case of a failure due to an open circuit, it would be immediately apparent by reason of both indications failing to operate.

10. Provision of operating current at all times is insured by the device indicated 3, 4 and 5 in Figure 1. Should the generator current fail, the switch members 4, 5 automatically introduce current from the storage battery.

11. Only that reply corresponding to the particular order given, can be actuated by the engineer. The arrangement that brings this about, makes it impossible for the engineer or receiver to reply to any but a given order.

12. It is impossible to hold more than one of the relays in the series $Z^1$ to $Z^{10}$ up at the same time, from the source of energy in the main line wire SB.

13. All currents are broken at the relays mentioned above, thus making it possible to encase the switches of the transmitting instruments in air-tight boxes.

14. The "make and break" form of contacts is employed rather than the "slide" variety.

15. The circuit arrangement makes it optional whether lamps, bells, pointers, shutters, or in fact any other kind of indication is used, any suitable indication being employed without necessitating changes in the apparatus.

16. Every order has an independent circuit on which it depends for its functioning. There is therefore no elaborate interlocking of circuit arangements to add complications and make repairs difficult.

17. Each signal when given, is electrically and not mechanically locked in the visible or operative positions.

18. Any suitable time recording mechanism can be used in connection with the individual relays, so that the time of operation in both directions of the relays in the series $Z^1$ to $Z^{10}$ can be recorded. The time of operation of the relay $Z^{11}$ is recorded only in the upward direction.

19. It should be observed in conclusion, that the relay mechanism is preferably located at the extremity of the busses in the engine room. The illustration in Figure 1 and other views of the drawings, shows the relays connected to the busses opposite the various instruments, merely for convenience in tracing out the circuits.

While the construction and arrangement of the improved ship telegraph as herein described and claimed, is that of a generally preferred form, obviously modifications and changes may be made without departing from the spirit of the invention or the scope of the claims.

I claim:—

1. The combination of an order instrument with order and reply signals, locally operated means for closing a circuit through a selected order signal, control means providing the return path of said circuit when normally positioned, and distantly operated means for moving said control means from the normal position to break the order signal circuit and close a circuit through the companion reply signal.

2. The combination of an order instrument with order and reply signals, locally operated means for closing a circuit through a selected order signal, control means providing the return path of said circuit when normally positioned, distantly operated means for moving said control means from the normal position to break the order signal circuit and close a circuit through the companion reply signal, and electrically operated holding means in said control means for maintaining the reply signal circuit after said distantly operated means is released.

3. A telegraph, comprising a plurality of transmitting instruments and a receiving instrument, each with a plurality of companion order and reply signals; companion order switches in all transmitting instruments, control means operatively common to all of said energized order signals to maintain them after said order switch is released, and a reply switch in the receiving instrument, operated to electrically actuate control means individual to the receiving instrument, said control means operating to divert the current from the energized order signals and thereby energize the companion reply signals while flowing from said common control means.

4. A telegraph, comprising a plurality of transmitting instruments and a receiving instrument, each instrument with a plurality of companion order and reply signals; a plurality of positive busses individually common to the various signals of the respective kinds, a plurality of control means individually common to the respective busses and corresponding circuits to supply current in one direction to a selected set of order signals in all instruments, and signal control means under individual control of the receiving instrument to divert the current from the then active bus and said energized order signals, through all companion reply signals.

5. In a telegraph, a plurality of control relays, and a "stand by" circuit including circuit breakers operatively associated with all control relays except one, enabling that one to operate without breaking the circuit.

6. In a telegraph, a plurality of control relays, and a circuit controlled by all of said relays, including circuit breakers operatively associated with each, and arranged to be completed when odd numbers of the relays are energized but open when even numbers of the relays are energized.

7. In a telegraph, a plurality of solenoidal control relays, an initially energized "stand by" circuit, including circuit breakers for each of the relays except one, and a positive bus and common return bus in connection with the excepted solenoidal relay, enabling the energization and operation of that relay without breaking the "stand by" circuit.

8. Means in a telegraph for automatically registering a "stand by" order indication, comprising a positive bus, a connected "stand by" circuit, a connected switch initially operative to energize the circuit and bus, a bus-connected "stand by" indication, and means affording a return for the current from said indication, including an isolated control relay with a contactor in normal repose.

9. Means in a telegraph for issuing audible and visible admonitory signals on starting signal operations, comprising a positive bus, a connected "stand by" circuit, a switch joined to the circuit with a connection beyond, energizing the circuit and bus upon initial operation of the switch; a bus-connected visible order indication, an audible signal joined to the aforesaid connection, and common current return means for both signals, including an isolated relay with a contactor in normal repose to close the return path.

10. Means in a telegraph for issuing audible and visible admonitory signals on starting signal operations, comprising a positive bus, a connected "stand by" circuit, a switch joined to the circuit with a connection beyond, energizing the circuit and bus upon initial operation of the switch; a bus-connected visible order indication, an audible signal joined to the aforesaid connection, common current return means for both signals, including an isolated relay with a contactor in normal repose to close the return path, and remotely located reply means operative to actuate said isolated relay, move the contactor, sever the current return path and thereby render both signals inoperative.

11. Means in a telegraph for manually issuing audible and visible admonitory signals, comprising an isolated remotely actuated current-return control relay in the energized position, with a normally reposed contactor in the lifted position; relay return means including a solenoid, an operative order reply indication receiving current from a positive bus and connected main supply wire, with a return through said lifted contactor, dormant visible and audible admonitory signals, and manually operated switch means for energizing the return solenoid and restoring said contactor to the position of repose, thereby closing a return path from said bus and main wire through the visible and audible signals, and rendering said reply indications inoperative.

12. A telegraph, comprising a plurality of order transmitting stations, an order receiving station, each with an order indication and an audible signal, a circuit embracing said stations and signals including a common return conductor, a feed conductor and switch in said circuit adapted upon closure to energize the circuit and all audible signals, the current returning via the common return conductor, and control means in said circuit adapted to complete a circuit from the feed conductor to said order indications, the current therefrom also returning via said common return conductor.

13. A telegraph comprising a plurality of order transmitting stations, an order receiving station, each having an order indication and an audible signal, a circuit embracing said stations and signals including a common return conductor, a feed conductor and switch in said circuit adapted upon closure to energize the circuit and all audible signals, the current returning via the common return conductor, control means in said circuit adapted to complete a circuit from the feed conductor to said order indications, the current therefrom also returning via said common return conductor, and instrumentalities operatively embodied in said completed circuit for automatically retaining said last means in the operative position.

14. A telegraph comprising a plurality of transmitting stations, a receiving station, admonitory and audible signals situated in each station, a return conductor common to all stations having circuit connections including a primary circuit embracing all audible signals and said common return conductor, a second circuit also embracing said signals and return conductor, a switch situated in said primary circuit being initially operable to close the primary circuit and cause the sounding of all audible signals, and control means situated in said secondary circuit operable concurrently with the sounding of said signals to complete said secondary circuit through all admonitory signals whence the current returns via said common return conductor.

15. A telegraph comprising a plurality of transmitting stations, a receiving station, admonitory and audible signals included in each station, a return conductor common to all stations, circuit connections including a primary circuit embracing all audible signals and said common return conductor, a switch situated in said primary circuit initially operable to close the primary circuit and cause the sounding of all audible signals, a secondary circuit also including said signals, electro-magnetic means simultaneously operable to complete said secondary circuit through all admonitory signals whence the current returns via said common return conductor, and means associated with and operated from the receiving station for breaking the primary circuit and rendering all audible and admonitory signals inactive.

16. A telegraph comprising a plurality of transmitting stations, a receiving station, admonitory and audible signals included in the stations, a return conductor common to all stations, circuit connections including a primary circuit embracing all audible signals and said common return conductor, a switch situated in said primary circuit and being initially operable to close the primary circuit and sound all audible signals, a secondary circuit also embracing said signals, electro-magnetic means simultaneously operated to complete said secondary circuit through all admonitory signals whence the current returns via said common return conductor, means associated with and operated from the receiving station for breaking the primary circuit and rendering all audible and admonitory signals inactive, and normally inactive reply signals embodied in all stations energized by said secondary circuit upon operation of said last named means.

17. A telegraph comprising a plurality of signal transmitting stations, admonitory and corresponding reply indicating means embodied in each of said stations, a signal receiving station, admonitory and corresponding reply indicating means embodied in said station, an electrical circuit embracing all of said stations, a switch in said circuit arranged upon operation to exhibit said admonitory indicating means at all stations, and means situated in said circuit and at said receiving station adapted upon operation to exhibit said reply indications and render the admonitory indicating means inactive at all stations independently of said switch.

18. A telegraph comprising a transmitting station having an admonitory signal, a receiving station having a reply signal, a source of electrical current for said stations, a circuit for energizing said signals comprising the following elements a line wire leading from the positive pole of said source, a normally closed path consisting of a series of contactors M and contacts in closed relation connected with said wire, a bus $A^5$, a connection between said contactors and bus, a connection 18 between the bus and each station, and a current return bus having communication with the negative pole of said source, a "stand by" order signal in the connection 18 of both the signal sending and receiving station, and a current return wire from each signal to the negative bus; a switch situated in the line wire for closure at the sending station to energize said circuit and cause the "stand by" signal to become operative at each station, and control means associated with each of the aforesaid armatures which are individually operable to break said circuit and to cause said signal to become inoperative.

19. The combination in a telegraph comprising a transmitting station having an admonitory signal, a receiving station having a reply signal, a source of electrical current for said stations, a circuit for energizing signals comprising the following elements a line wire and bus SB in communication with the positive pole of said source, a connection for each station to the bus, an admonitory signal in said connection of the sending and receiving stations, a current return bus OC having communication with the negative pole of said source, a branch connection of the line wire having a series of contactors and contacts in normal engagement, a bus $A^5$, a connection between said contactors in series and bus $A^5$, a connection 18 between said bus and each station, and a "stand by" order signal in the connection 18 of both the signal sending and receiving stations, each having a connection to said return bus OC; a switch situated in the line wire for closure at the sending station only thereby to energize said circuit and cause the admonitory signals to operate simultaneously with the appearance of the "stand by" signals in both stations, and means to move any one of said contactors and thereby break said circuit and cause the simultaneous cessation of operation and disappearance of the admonitory and "stand by" signals.

20. A telegraph comprising a transmitting station, a receiving station, a series of order signals in each station, a series of reply signals in each station, a switch for each order signal in the transmitting station, a switch for each reply signal in the receiving station, a positive current conductor common to all signals in both stations, a negative return conductor with which connection is made upon the closure of any order signal switch causing the corresponding order to appear in both stations, a relay having a contactor in position against one point to complete a current path from said order signal return conductor, a negative current return conductor placed in connection with said positive conductor upon the closure of a corresponding order reply switch in the receiving station, and means for operating the relay to shift the contactor into connection with another point to complete a current path from said negative reply conductor, thereby diverting the signal current to corresponding reply signals in both stations.

21. A telegraph comprising transmitting and receiving stations, a series of order signals having corresponding reply signals arranged in pairs in each station, a switch at each order signal in the transmitting station, a circuit energized upon closure of an order switch to operate the corresponding order signal in all stations, a relay $Z^{11}$ having a pair of contacts and having a contactor 160 normally engaging one contact to close one current return path from said order signals, a switch for each reply signal in the receiving station and a circuit embracing the coil of the relay $Z^{11}$, which circuit is completed upon closure of said reply switch to energize the relay and shift the contactor to engage the other contact and close another current return path from the reply signals of all stations.

22. A telegraph comprising transmitting and receiving stations, pairs of order and reply signals in each station, a switch associated with each pair of signals in the transmitting station, a circuit energized upon the closure of any one of said switches causing corresponding order signals in all stations to be operated, a solenoid having a contactor 160 in position to close a current return path when the order signals are operated, a switch for each reply signal in the receiving station, a circuit energized upon closure of an order switch to operate the corresponding reply signal in all stations and energize said solenoid to shift the contactor and close another current return path, opening the former, and another contactor $S^{11}$ associated with said solenoid shifted upon said energization thereof to complete a path therethrough causing the solenoid to remain energized so that the first contactor remains in the shifted position.

23. A telegraph comprising transmitting and receiving stations, pairs of order and reply signals in each station, a switch associated with each pair of signals in the transmitting station, a circuit energized upon the closure of any one of said switches causing corresponding order signals in all stations to be operated, a solenoid having a contactor 160, a contact engaged by said contactor to close a current return path when the order signals are operated, a switch for each reply signal in the receiving station, a circuit energized upon closure of said switch to operate the corresponding reply signal in all stations and energize said solenoid to shift the contactor 160, a second contact then engaged by said contactor to and close another current return path, said contactor disengaging the first contact to open the former circuit, another contactor $S^{11}$ associated with said solenoid shifted upon said energization thereof, a contact then engaged by said contactor $S^{11}$ to complete a path therethrough causing the solenoid to remain energized so that the first contactor 160 remains in the shifted position, and means which is energized upon the subsequent closure of another one of the order switches in the transmitting station to move said contactor $S^{11}$ to the original position and shift the first contactor 160 into reengagement with the first contact to restore the circuit of the order signal return conductor.

24. A telegraph comprising a transmitting station having a series of pairs of order and reply signals, a receiving station having a series of corresponding pairs of order and reply signals, a switch for each reply signal in the receiving station, a circuit energized upon closure of a switch to energize corresponding reply signals in both stations, a solenoidal relay having a winding included in said circuit thereby to be energized upon the closure of said switch, a contactor held in one position by the relay core when said winding is energized, a current return path closed by said contactor from said reply signals, a switch for each order signal in the transmitting station, a circuit which is energized upon closure of said order switch to operate corresponding order signals in both stations, and a second winding in said relay including in said last circuit and thereby energized upon said order switch closure to retract the core and shift the contactor for the opening of said current return path.

25. A telegraph comprising a transmitting station having a series of order signals, a receiving station having a series of corresponding order signals, a switch for each order signal in the transmitting station, a series of movable contactors and contact points constituting part of an electrical circuit which is energized to operate all order signals of one kind in each station upon the closure of the corresponding switch in the transmitting station, and solenoidal relays, one for each order switch represented, having cores to operate said contactors, contacts which are engaged by said contactors to cause a closure of the contactor circuit when one order switch is closed and the corresponding relay is energized but so operate said contactors in respect to the contacts as to open said circuit when two order switches are closed, thereby preventing the transmission of diverse or contradictory orders.

26. A telegraph comprising a transmitting station having a series of pairs of order and reply signals, a positive current conductor having common connection with all of said signals, a plurality of busses one for each pair of signals, individual switches having connections with said positive current conductor, busses and signals being adapted upon closure to cause the energization of a corresponding signal, and bus from said positive conductor, a series of solenoidal relays one for each pair of signals said relays being connected with individual busses and adapted to be energized as a corresponding bus is energized, a contactor circuit having contacts and being connected with said conductor, and one contactor in each circuit for each relay individually actuated to engage a contact when the respective relay is energized to maintain the continuity of current through the energized relay and corresponding bus after the switch has been released.

27. A telegraph comprising a plurality of order transmitting stations each with a plurality of order and reply signals and corresponding order switches, a receiving station having corresponding order and reply signals, a current feed SB, order reply D and common return conductors OC, RC and C, a plurality of control means each being common to all order signals of similar kinds, a bus which is directly energized from said feed conductor SB upon operation of a selected order switch, all orders corresponding to the selected switch being energized simultaneously with said bus, a primary shunt circuit including and then energizing the control means of the selected order from said bus to the common return conductor C, a contactor, circuits M and S through which a secondary circuit is completed from the feed conductor SB to the common return conductor C independently of said bus, reply switches in the receiving station, and an independent control means $Z^{11}$ in circuit with conductors E and C to be actuated upon operation of a reply switch to accomplish the following: break the order return conductor to render all order signals inoperative, interrupt the direct energization of the bus and establish the energization thereof through said secondary and primary circuits, the latter keeping the first control means energized, connect the reply conductor with said common return and cause the operation of all reply signals by current from said bus.

28. A telegraph comprising a plurality of transmitting stations, a receiving station, admonitory and audible signals included in each station, a return conductor common to all stations, circuit connections including a primary circuit embracing all audible signals and said common return conductor, a switch situated in said primary circuit being initially operable to close the primary circuit and cause the sounding of all audible signals, a secondary circuit also embracing said signals, and electromagnetic means simultaneously operable to complete said secondary circuit through all admonitory signals whence the current returns via said common return conductor.

29. A telegraph comprising a transmitting station, a receiving station, a plurality of order signals in each station, a plurality of reply signals in each station, a plurality of positive current busses common to all similar order and reply signals of both stations, individual wires connecting similar order and reply signals to the respective busses, a current return conductor common to order signals of both stations, a switch for each order signal in the transmitting station, one of said switches being depressible to thereby complete a circuit from a particular bus over one of said individual wires and through the corresponding order signal to said common negative order conductor to render said signal operative, a conductor common to the reply signals of both stations, a switch for each reply signal at the receiving station, and means including a relay $Z^{11}$ arranged upon closure of the reply switch of the then operative order signal to divert the current path from said then operative order signal and common positive order conductor to the corresponding reply signals in both stations and said negative common conductor.

30. A telegraph comprising a transmitting station having an order signal, a switch, a circuit which is completed upon closure of said switch to make said signal operative, a solenoidal relay which is energized upon the closing of said circuit, said relay having a core, a contactor circuit including a contactor operable by the core of said relay, a branch circuit embracing said relay being closed by said contactor to maintain the continuity of the branch circuit through said relay after said order switch is released, and another contactor circuit including a contactor also operable by said relay core to complete a current path over said other contactor circuit for both the foregoing contactor circuit and to the order which was made operative by the previous closure of said switch.

WILLIAM REED HORNBERGER.